(12) United States Patent
Aladahalli et al.

(10) Patent No.: US 12,229,670 B2
(45) Date of Patent: Feb. 18, 2025

(54) TEMPORALIZING OR SPATIALIZING NETWORKS

(71) Applicant: GE Precision Healthcare LLC, Milwaukee, WI (US)

(72) Inventors: Chandan Aladahalli, Bengaluru (IN); Krishna Seetharam Shriram, Bangalore (IN); Vikram Melapudi, Bangalore (IN)

(73) Assignee: GE PRECISION HEALTHCARE LLC, Waukesha, WI (US)

( * ) Notice: Subject to any disclaimer, the term of this patent is extended or adjusted under 35 U.S.C. 154(b) by 812 days.

(21) Appl. No.: 17/358,694

(22) Filed: Jun. 25, 2021

(65) Prior Publication Data
US 2022/0414449 A1    Dec. 29, 2022

(51) Int. Cl.
*G06N 3/08* (2023.01)
*G06F 18/25* (2023.01)

(52) U.S. Cl.
CPC ............... *G06N 3/08* (2013.01); *G06F 18/25* (2023.01)

(58) Field of Classification Search
CPC ........ G06N 3/08; G06N 3/0455; G06N 3/082; G06F 18/25; G06V 10/82
See application file for complete search history.

(56) References Cited

U.S. PATENT DOCUMENTS

| 2017/0262737 | A1* | 9/2017 | Rabinovich | G06V 30/194 |
| 2020/0401896 | A1* | 12/2020 | Goodfellow | G06N 3/045 |
| 2022/0134435 | A1* | 5/2022 | Scime | G06T 7/11 |
| | | | | 264/112 |

OTHER PUBLICATIONS

Prechelt, Lutz. "Early stopping-but when?." Neural Networks: Tricks of the trade. Berlin, Heidelberg: Springer Berlin Heidelberg, 2002. 55-69. (Year: 2002).*
Wu, Yunfeng, and Juan I. Arribas. "Fusing output information in neural networks: Ensemble performs better." Proceedings of the 25th Annual International Conference of the IEEE Engineering in Medicine and Biology Society (IEEE Cat. No. 03CH37439). vol. 3. IEEE, 2003. (Year: 2003).*
Tseng, Kuan-Lun, et al. "Joint sequence learning and cross-modality convolution for 3D biomedical segmentation." Proceedings of the IEEE conference on Computer Vision and Pattern Recognition. 2017. (Year: 2017).*
Zhou, Yi, et al. "Elastic neural networks for classification." 2019 IEEE International Conference on Artificial Intelligence Circuits and Systems (AICAS). IEEE, 2019. (Year: 2019).*

(Continued)

*Primary Examiner* — Oluwatosin Alabi
*Assistant Examiner* — Nicholas S Wu
(74) *Attorney, Agent, or Firm* — Amin, Turocy & Watson, LLP

(57) ABSTRACT

Systems, computer-implemented methods, and computer program products that facilitate temporalizing and/or spatializing a machine learning and/or artificial intelligence network are provided. In various embodiments, a processor can combine output data from different layers of an artificial neural network trained on static image data. In various embodiments, the processor can employ the artificial neural network to infer an outcome from an image instance in a sequence of images based on combined output data from the different layers of the artificial neural network.

20 Claims, 12 Drawing Sheets

(56) References Cited

OTHER PUBLICATIONS

Kandaswamy, Chetak, et al. "Improving transfer learning accuracy by reusing stacked denoising autoencoders." 2014 IEEE International Conference on Systems, Man, and Cybernetics (SMC). IEEE, 2014. (Year: 2014).*

Shan, Hongming, et al. "3-D convolutional encoder-decoder network for low-dose CT via transfer learning from a 2-D trained network." IEEE transactions on medical imaging 37.6 (2018): 1522-1534. (Year: 2018).*

Chen, Runfa, et al. "Reusing discriminators for encoding: Towards unsupervised image-to-image translation." Proceedings of the IEEE/CVF conference on computer vision and pattern recognition. 2020. (Year: 2020).*

Liu, et al., "Deep Fitting Degree Scoring Network for Monocular 3D Object Detection," https://arxiv.org/abs/1904.12681, arXiv:1904.12681v2 [cs.CV] Jun. 8, 2019, the entire document.

Yu, et al., "Thickened 2D Networks for Efficient 3D Medical Image Segmentation," https://arxiv.org/abs/1904.01150, arXiv:1904.01150v2 [cs.CV] Nov. 23, 2019, the entire document.

* cited by examiner

900b

902b — TAKING, BY A DEVICE OPERATIVELY COUPLED TO A PROCESSOR, A PRETRAINED ARTIFICIAL NEURAL NETWORK THAT INFERS ON LOW DIMENSIONAL DATA, DUPLICATING, BY THE DEVICE, THE PRETRAINED ARTIFICIAL NEURAL NETWORK UNTIL A CERTAIN LAYER TO GENERATE ONE OR MORE DUPLICATE UNITS OF THE PRETRAINED ARTIFICIAL NEURAL NETWORK, COMBINING, BY THE DEVICE, OUTPUT FROM THE ONE OR MORE DUPLICATE UNITS AFTER THE CERTAIN LAYER, AND PROVIDING, BY THE DEVICE, COMBINED OUTPUT FROM THE ONE OR MORE DUPLICATE UNITS TO AT LEAST ONE PORTION OF THE PRETRAINED ARTIFICIAL NEURAL NETWORK

904b — EMPLOYING, BY THE DEVICE, THE PRETRAINED ARTIFICIAL NEURAL NETWORK TO INFER AN OUTCOME FROM A HIGHER DIMENSIONAL DATA THAT IS REDUCED INTO A SET OF LOWER DIMENSIONAL DATA, EACH OF WHICH IS INPUT TO THE ONE OR MORE DUPLICATE UNITS.

FIG. 9B

TEMPORALIZING OR SPATIALIZING NETWORKS

TECHNICAL FIELD

The embodiments described herein relate to machine learning and/or artificial intelligence networks, and more specifically, to temporalizing and/or spatializing a machine learning and/or artificial intelligence network.

BACKGROUND

Many machine learning (ML) and/or artificial intelligence (AI) networks (e.g., deep learning (DL) networks, two-dimensional (2D) networks, and/or another network) are available that infer on single and/or static images. When such networks are deployed on sequences of images (e.g., temporal and/or spatial images), a lack of context can lead to instability in inferred outcomes. Unfortunately, there are no existing systems and/or techniques that facilitate enlarging the context of such a sequence of images to include temporal and/or spatial information, without retraining the network. Accordingly, systems and/or techniques that can address this technical problem can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that can facilitate temporalizing and/or spatializing a machine learning and/or artificial intelligence network are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a network augmentation component. In various embodiments, network augmentation component can combine output data from different layers of an artificial neural network trained on static image data. In various embodiments, the computer-executable components can further comprise a network application component. In various embodiments, the network application component can employ the artificial neural network to infer an outcome from an image instance in a sequence of images based on combined output data from the different layers of the artificial neural network.

According to one or more embodiments, the above-described system can be implemented as a computer-implemented method and/or a computer program product.

DESCRIPTION OF THE DRAWINGS

FIGS. 9A-9B illustrate flow diagram(s) of an example, non-limiting computer-implemented method that can facilitate temporalizing and/or spatializing a machine learning and/or artificial intelligence network in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

As referenced herein, an "entity" can comprise a human, a client, a user, a computing device, a software application, an agent, a machine learning (ML) model, an artificial intelligence (AI) model, and/or another entity. It will be understood that when a component and/or an element is referred to herein as being "coupled" to another component and/or element, respectively, it can describe one or more different types of coupling including, but not limited to, communicative coupling, electrical coupling, operative coupling, optical coupling, physical coupling, and/or another type of coupling.

Figure 1:
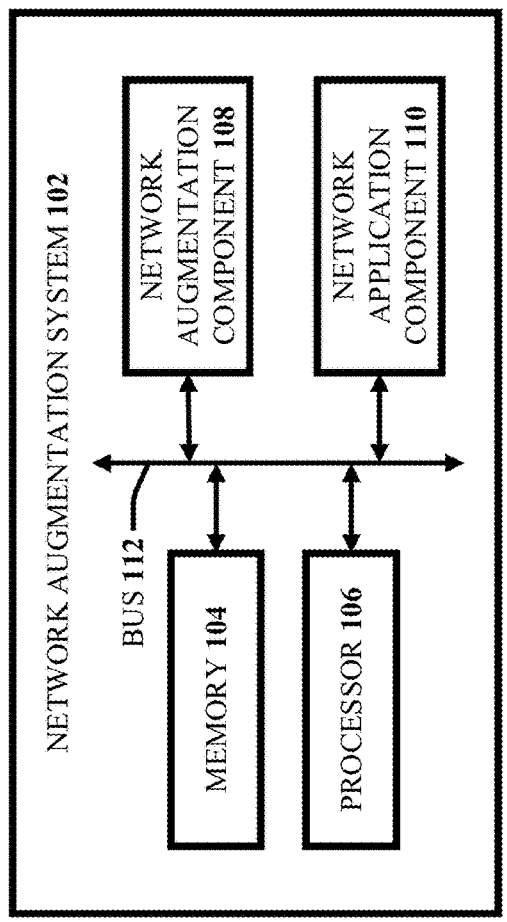
FIG. 1 illustrates a block diagram of an example, non-limiting system that can facilitate temporalizing and/or spatializing a machine learning and/or artificial intelligence network in accordance with one or more embodiments described herein.

FIG. 1 illustrates a block diagram of an example, non-limiting system 100 that can facilitate temporalizing and/or spatializing a machine learning and/or artificial intelligence network in accordance with one or more embodiments described herein. System 100 can comprise a network augmentation system 102. Network augmentation system 102 can comprise a memory 104, a processor 106, a network augmentation component 108, a network application component 110, and/or a bus 112.

It should be appreciated that the embodiments described herein and/or depicted in various figures are for illustration only, and as such, the architecture of such embodiments are not limited to the systems, devices, and/or components depicted therein. For example, in some embodiments, system 100 and/or network augmentation system 102 can further comprise various computer and/or computing-based elements described herein with reference to computing environment 1000 and FIG. 10. In several embodiments, such computer and/or computing-based elements can be used in connection with implementing one or more of the systems, devices, components, and/or computer-implemented operations shown and described in connection with FIG. 1 and/or other figures disclosed herein.

Memory 104 can comprise a computer-readable memory that can store one or more computer and/or machine readable, writable, and/or executable components and/or instructions that, when executed by processor 106 (e.g., a classical processor, a graphics processing unit (GPU), a quantum processor, and/or another type of processor), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to network augmentation system 102, network augmentation component 108, network application component 110, and/or another component associated with network augmentation system 102 as described herein with or without reference to the various figures.

Memory 104 can comprise volatile memory (e.g., random access memory (RAM), static RAM (SRAM), dynamic RAM (DRAM), and/or another type of volatile memory) and/or non-volatile memory (e.g., read only memory (ROM), programmable ROM (PROM), electrically programmable ROM (EPROM), electrically erasable programmable ROM (EEPROM), and/or another type of non-volatile memory) that can employ one or more memory architectures. Further examples of memory 104 are described below with reference to system memory 1006 and FIG. 10. Such examples of memory 104 can be employed to implement any embodiments described herein.

Processor 106 can comprise one or more types of processors and/or electronic circuitry (e.g., a classical processor, a GPU, a quantum processor, and/or another type of processor and/or electronic circuitry) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit (CPU), multi-core processor, microprocessor, dual microprocessors, microcontroller, System on a Chip (SOC), array processor, vector processor, quantum processor, and/or another type of processor. In some embodiments, processor 106 can comprise a processing unit (e.g., a GPU) that has a greater number of cores (e.g., 100 times, 500 times, or 1000 times as many cores) than that of a classical processor (e.g., a CPU). In these embodiments, processor 106 can comprise such a processing unit (e.g., a GPU) that can provide a greater capacity to perform parallel processing and/or can comprise a larger memory bandwidth than that of classical processor (e.g., a CPU). For example, processor 106 can comprise a GPU that has a greater capacity to perform parallel processing (e.g., via a greater number of cores (e.g., 100 times, 500 times, or 1000 times as many cores) as a classical processor (e.g., a CPU)) and/or that has a larger memory bandwidth than that of a classical processor (e.g., a CPU). Further examples of processor 106 are described below with reference to processing unit 1004 and FIG. 10. Such examples of processor 106 can be employed to implement any embodiments described herein.

Network augmentation system 102, memory 104, processor 106, network augmentation component 108, network application component 110, and/or another component of network augmentation system 102 as described herein can be communicatively, electrically, operatively, and/or optically coupled to one another via bus 112 to perform functions of system 100, network augmentation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 1008 and FIG. 10. Such examples of bus 112 can be employed to implement any embodiments described herein.

Network augmentation system 102 can comprise any type of component, machine, device, facility, apparatus, and/or instrument that comprises a processor and/or can be capable of effective and/or operative communication with a wired and/or wireless network. All such embodiments are envisioned. For example, network augmentation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Network augmentation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a wire and/or a cable. For example, network augmentation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) using a data cable including, but not limited to, a High-Definition Multimedia Interface (HDMI) cable, a recommended standard (RS) 232 cable, an Ethernet cable, and/or another data cable.

In some embodiments, network augmentation system 102 can be coupled (e.g., communicatively, electrically, operatively, optically, and/or coupled via another type of coupling) to one or more external systems, sources, and/or devices (e.g., classical and/or quantum computing devices, communication devices, and/or another type of external system, source, and/or device) via a network. For example, such a network can comprise wired and/or wireless networks, including, but not limited to, a cellular network, a wide area network (WAN) (e.g., the Internet), a local area network (LAN), and/or another network. Network augmentation system 102 can communicate with one or more external systems, sources, and/or devices, for instance, computing devices using virtually any desired wired and/or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. Therefore, in some embodiments, network augmentation system 102 can comprise hardware (e.g., a central processing unit (CPU), a transceiver, a decoder, quantum hardware, a quantum processor, and/or other hardware), software (e.g., a set of threads, a set of processes, software in execution, quantum pulse schedule, quantum circuit, quantum gates, and/or other software) or a combination of hardware and software that can facilitate communicating information between network augmentation system 102 and external systems, sources, and/or devices (e.g., computing devices, communication devices, and/or another type of external system, source, and/or device).

Network augmentation system 102 can comprise one or more computer and/or machine readable, writable, and/or executable components and/or instructions that, when executed by processor 106 (e.g., a classical processor, a GPU, a quantum processor, and/or another type of processor), can facilitate performance of operations defined by such component(s) and/or instruction(s). Further, in numerous embodiments, any component associated with network augmentation system 102, as described herein with or without reference to the various figures, can comprise one or more computer and/or machine readable, writable, and/or executable components and/or instructions that, when executed by processor 106, can facilitate performance of operations defined by such component(s) and/or instruction(s). For example, network augmentation component 108, network application component 110, and/or another component of, and/or associated with, network augmentation system 102 as disclosed herein (e.g., communicatively, electronically, operatively, and/or optically coupled with and/or employed by network augmentation system 102), can comprise such computer and/or machine readable, writable, and/or executable component(s) and/or instruction(s). Consequently, according to numerous embodiments, network augmentation system 102 and/or any components of and/or associated therewith, as disclosed herein, can employ processor 106 to execute such computer and/or machine readable, writable, and/or executable component(s) and/or instruction(s) to facilitate performance of one or more operations described herein with reference to network augmentation system 102 and/or any such components of and/or associated therewith.

Network augmentation system 102 can facilitate (e.g., via processor 106) performance of operations executed by and/or associated with network augmentation component 108, network application component 110, and/or another component of and/or associated with network augmentation system 102 as disclosed herein. For example, as described in detail below, network augmentation system 102 can facilitate (e.g., via processor 106): combining output data from different layers of an artificial neural network trained on static image data; and/or employing the artificial neural network to infer an outcome from an image instance in a sequence of images based on combined output data from the different layers of the artificial neural network.

In another example, as described in detail below, network augmentation system 102 can facilitate (e.g., via processor 106): combining the output data from the different layers of the artificial neural network at one or more combination points defined in the artificial neural network, where the one or more combination points are defined by an entity (e.g., an entity as defined herein); averaging the output data from the different layers of the artificial neural network to generate the combined output data; and/or combining the output data from the different layers of the artificial neural network to provide at least one of temporal context data or spatial context data that is used to infer the outcome from the image instance in the sequence of images and to eliminate retraining of the artificial neural network to infer the outcome from the image instance in the sequence of images.

In the examples above, the sequence of images can comprise a sequence of static images, a sequence of temporal images, a sequence of video frames, and/or a sequence of spatial images. In the examples above, the combined output data can comprise combined latent space output data of multiple image instances in the sequence of images. In the examples above, the different layers of the artificial neural network can comprise different input layers of the artificial neural network, different latent variables layers of the artificial neural network, and/or different output layers of the artificial neural network.

As described below with reference to the example embodiments illustrated in FIGS. 2-8, network augmentation component 108 and/or network application component 110 can each perform one or more of the above described operations that can be facilitated by network augmentation system 102. In an example, network augmentation component 108 can combine output data from different layers of an artificial neural network trained on static image data (e.g., single and/or static 2D images) and network application component 110 can employ the artificial neural network to infer an outcome from an image instance in a sequence of images based on combined output data from the different layers of the artificial neural network. For instance, network augmentation component 108 can combine latent space output data from different layers of the artificial neural network, where such different layers can include, but are not limited to, different input layers of the artificial neural network, different latent variables layers of the artificial neural network, different output layers of the artificial neural network, and/or other different layers of the artificial neural network. In another example, network augmentation component 108 can combine the output data from the different layers of the artificial neural network at one or more combination points defined in the artificial neural network, where the one or more combination points can be defined by an entity (e.g., an entity as defined herein can use an interface component (not illustrated in the figures) of network augmentation system 102 such as, for instance, a graphical user interface (GUI), an application programming interface (API), and/or another interface component to define such combination point(s)). In another example, network augmentation component 108 can average the output data from the different layers of the artificial neural network to generate the combined output data. In some embodiments, the combined output data can comprise combined latent space output data of multiple image instances in the sequence of images and/or the sequence of images can comprise a sequence of static images, a sequence of temporal images, a sequence of video frames, and/or a sequence of spatial images. In another example, network augmentation component 108 can combine the output data from the different layers of the artificial neural network to provide temporal context data and/or spatial context data that can be used (e.g., by network application component 110) to infer the outcome from the image instance in the sequence of images and/or to eliminate retraining of the artificial neural network to infer the outcome from the image instance in the sequence of images.

In some embodiments, network augmentation component 108 can: take a pretrained artificial neural network that infers on low dimensional data (e.g., a 2D ML and/or AI network trained on single and/or static 2D images); duplicate the pretrained artificial neural network until a certain layer to generate one or more duplicate units of the pretrained artificial neural network (e.g., one or more duplicate encoder units); combine output from the one or more duplicate units after the certain layer; and/or provide combined output from the one or more duplicate units to at least one portion of the pretrained artificial neural network (e.g., a duplicated encoder unit and/or a decoder). In these embodiments, network application component 110 can employ the pretrained artificial neural network (e.g., subsequent to above described operations that can be performed by network augmentation component 108) to infer an outcome from a higher dimensional data that is reduced into a set of lower dimensional data, each of which is input to the one or more duplicate units.

It should be appreciated that, in accordance with one or more embodiments described herein, for a given network (e.g., a 2D ML and/or AI network), network augmentation system 102 can enlarge the context of a sequence of images (e.g., temporal and/or spatial images) to include temporal (e.g., time) and/or spatial (e.g., volume) information without any retraining of the network. In one or more embodiments described herein, network augmentation system 102 can use one or more images from a temporal neighborhood (e.g., frames of a video) and/or one or more images from a spatial neighborhood (e.g., slices (e.g., cross-sectional views) of a three-dimensional (3D) volume (e.g., an object) in, for instance, a computed tomography (CT) image, a magnetic resonance (MR) image, a positron emission tomography (PET) image, and/or another image of a 3D volume) to enlarge the context of such a sequence of images described above. For example, in one or more embodiments described herein, network augmentation system 102 can enlarge the context of such a sequence of images by combining outputs from different layers of a given network (e.g., a 2D ML and/or AI network) when multiple single and/or static images are fed into the network separately. In such one or more embodiments, network augmentation system 102 can perform the combination of outputs at, for example, an input level, a latent variables level, and/or an output level (e.g., a final output level) of such a network. In such or more embodiments, network augmentation system 102 can perform the combination to provide temporal and/or spatial context while enabling the same network to infer on any single image instance in, for example, a video (e.g., a video frame) and/or a volume (e.g., slices (e.g., cross-sectional views) of a 3D volume (e.g., an object) in, for instance, a CT image, an MR image, and/or a PET image).

In accordance with one or more embodiments described herein, it should be appreciated that, by combining latent space outputs of multiple images input to a given network (e.g., a 2D ML and/or AI network) that has been trained on static image data (e.g., single and/or static 2D images), network augmentation system 102 can enable such a network to thereby become relatively more robust and/or more stable compared to another network (e.g., another 2D ML and/or AI network) trained on static image data, as such a given network can use redundant information from multiple similar images to infer on any single image instance in a sequence of images. It should be appreciated that, in accordance with one or more embodiments described herein, network augmentation system 102 can eliminate retraining of a given network (e.g., a 2D ML and/or AI network) that has been trained on static image data, as components of such a network can be reused to infer an outcome from an image instance in a sequence of images. Additionally, or alternatively, it should be appreciated that, in one or more embodiments described herein, network augmentation system 102 can enable the size of such a given network to remain relatively compact, as the addition of new weights can be eliminated. That is, for example, in various embodiments, no new weights are added by network augmentation system 102 to such a given network.

It should be further appreciated that in accordance with one or more embodiments described herein, network augmentation system 102 can enable higher dimensional inferencing from lower dimensional networks. For example, in accordance with one or more embodiments described herein, network augmentation system 102 (e.g., via network augmentation component 108) can combine output data from different layers of an artificial neural network that has been trained on static image data, where such training is on N dimensions. In this example, in accordance with one or more embodiments described herein, network augmentation system 102 (e.g., via network application component 110) can further employ the artificial neural network to infer an outcome from an image instance in a sequence of images based on combined output data from the different layers of the artificial neural network, where such an outcome inference is made on N+1 dimensions from the sequence of images (e.g., a temporal dimension, a spatial dimension, and/or another dimension).

Figure 2:
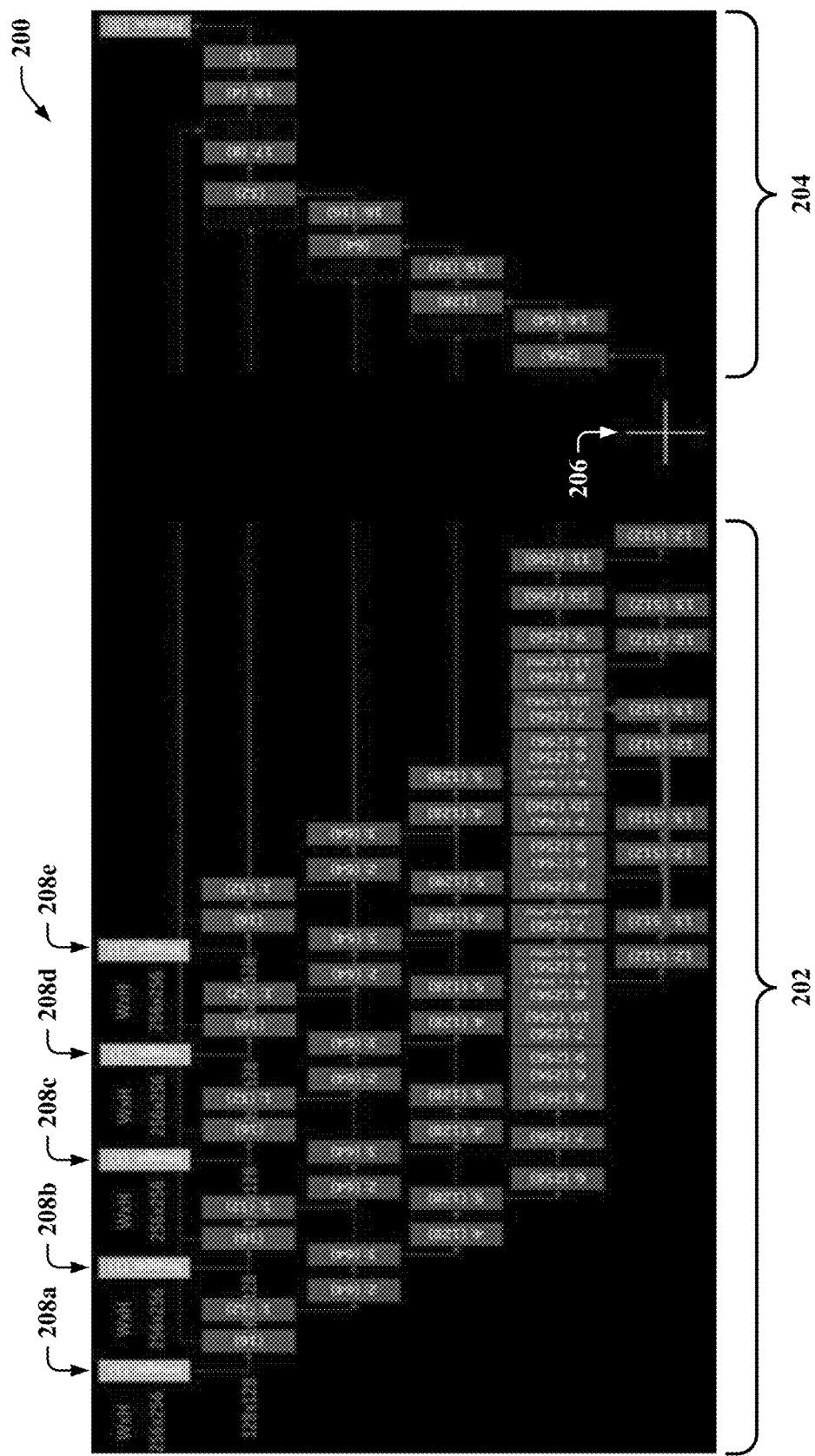
FIGS. 2, 3, and 4 illustrate example, non-limiting networks that can each facilitate temporalizing and/or spatializing a machine learning and/or artificial intelligence network in accordance with one or more embodiments described herein.

FIG. 2 illustrates an example, non-limiting network 200 that can facilitate temporalizing and/or spatializing a machine learning and/or artificial intelligence network in accordance with one or more embodiments described herein. Repetitive description of like elements and/or processes employed in respective embodiments is omitted for sake of brevity.

In the example embodiment depicted in FIG. 2, network 200 can comprise an artificial neural network (e.g., a 2D ML and/or AI network) that has been trained on static image data (e.g., single and/or static 2D images). For instance, in this example embodiment, network 200 can comprise an encoder-decoder neural network that has been trained on static image data (e.g., single and/or static 2D images). As illustrated in the example embodiment depicted in FIG. 2, network 200 can comprise an encoder 202 and a decoder 204. Although network 200 illustrated in the example embodiment depicted in FIG. 2 can comprise an encoder-decoder neural network, it should be appreciated that the various embodiments described herein are not so limiting. For example, network 200 can comprise any type of artificial neural network trained on static image data (e.g., single and/or static 2D images) that network augmentation system 102 can temporalize and/or spatialize in accordance with one or more embodiments described herein to enlarge the context of a sequence of images (e.g., temporal and/or spatial images) and/or to infer an outcome from an image instance in the sequence of images (e.g., to infer an outcome from a video frame in video data (e.g., a video) and/or a slice (e.g., a cross-sectional view) of a 3D volume in, for instance, a CT image, an MR image, and/or a PET image).

In the example embodiment depicted in FIG. 2, network 200 illustrates how network augmentation system 102 (e.g., via network augmentation component 108) can combine output data (e.g., latent space output data) from different layers of an artificial neural network (e.g., a 2D ML and/or AI network) that has been trained on static image data (e.g., single and/or static 2D images). In this example embodiment, such combination is represented by an addition symbol 206 depicted as "+" in FIG. 2. In this example embodiment, network 200 further illustrates how network augmentation system 102 (e.g., via network application component 110) can infer an outcome from an image instance in a sequence of images (e.g., multiple input video frames and/or multiple input slices (e.g., cross-sectional views) of a 3D volume in an image) based on combined output data (e.g., latent space output data) from the different layers of the artificial neural network.

In some embodiments, network augmentation system 102 and/or network augmentation component 108 can average (e.g., average in time (t)) the output data (e.g., latent space output data) from different layers of an artificial neural network to perform the combination represented by addition symbol 206 in FIG. 2. In some embodiments, network augmentation system 102 and/or network augmentation component 108 can use another technique (e.g., another mathematical technique) to combine the output data from different layers of an artificial neural network as represented by addition symbol 206 in FIG. 2.

As illustrated in the example embodiment depicted in FIG. 2, to facilitate such combination of output data (e.g., latent space output data) from different layers of an artificial neural network (e.g., a 2D ML and/or AI network) that has been trained on static image data (e.g., single and/or static 2D images), network augmentation system 102 and/or network augmentation component 108 can duplicate an encoder unit of an encoder-decoder neural network one or more times to generate one or more additional encoder units, for instance, as represented by encoder 202 in FIG. 2. In this example embodiment, network augmentation system 102 and/or network augmentation component 108 can use one or more components of an original encoder unit (e.g., the same filters, weights, and/or another component of the original encoder unit) to perform such encoder unit duplication and generate encoder 202 illustrated in FIG. 2.

In the example embodiment depicted in FIG. 2, network augmentation system 102 and/or network augmentation component 108 can duplicate an encoder unit multiple times to enable image instances 208a, 208b, 208c, 208d, 208e to respectively pass through each of the duplicated encoder units of encoder 202. In some embodiments, each of image instances 208a, 208b, 208c, 208d, 208e can comprise a different image instance of a sequence of images. For example, each of image instances 208a, 208b, 208c, 208d, 208e can comprise a different video frame of a sequence of video frames, a different cross-sectional image (e.g., a slice) of a volume (e.g., an object) captured in, for instance, a CT image, an MR image, a PET image, and/or another image instance of a sequence of images. In the example embodiment depicted in FIG. 2, based on the above described combination of output data (e.g., latent space output data) from different layers of encoder 202, network augmentation system 102 and/or network application component 110 can use such combined output data as input to decoder 204 to infer an outcome from one or more of image instances 208a, 208b, 208c, 208d, 208e in accordance with one or more embodiments described herein.

In the example embodiment depicted in FIG. 2, the above described combination represented by addition symbol 206 of output data (e.g., latent space output data) from different layers of an artificial neural network (e.g., a 2D ML and/or AI network) that has been trained on static image data (e.g., single and/or static 2D images) can be performed by network augmentation system 102 and/or network augmentation component 108 at the output layer of encoder 202. In this example embodiment, network 200 can therefore constitute a post encoder combined network. However, it should be appreciated that the various embodiments of the subject disclosure are not so limiting. For example, network augmentation system 102 and/or network augmentation component 108 can perform such combination of such output data at one or more other layers of such an artificial neural network. For instance, network augmentation system 102 and/or network augmentation component 108 can perform such combination of such output data at one or more input layers of the artificial neural network, one or more latent variables layers of the artificial neural network, and/or one or more output layers of the artificial neural network.

Figure 3:
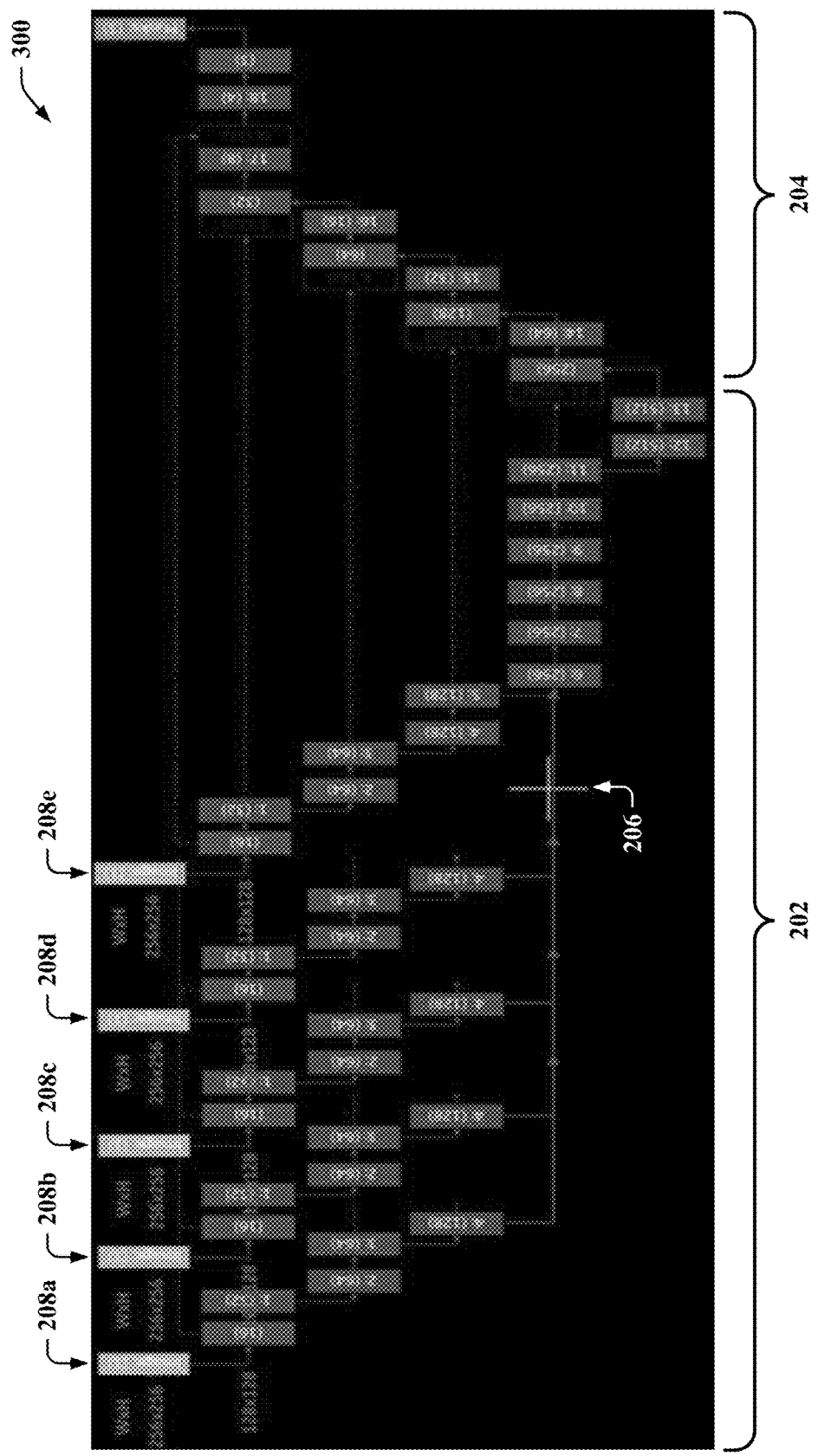

FIG. 3 illustrates an example, non-limiting network 300 that can facilitate temporalizing and/or spatializing a machine learning and/or artificial intelligence network in accordance with one or more embodiments described herein. Repetitive description of like elements and/or processes employed in respective embodiments is omitted for sake of brevity.

In the example embodiment depicted in FIG. 3, network 300 can comprise an artificial neural network (e.g., a 2D ML and/or AI network) that has been trained on static image data (e.g., single and/or static 2D images). For instance, in this example embodiment, network 300 can comprise an encoder-decoder neural network that has been trained on static image data (e.g., single and/or static 2D images). Network 300 illustrated in the example embodiment depicted in FIG. 3 can comprise an example, non-limiting alternative embodiment of network 200 described above and illustrated in FIG. 2. As illustrated in the example embodiment depicted in FIG. 3, network 300 can comprise encoder 202 and decoder 204, where encoder 202 can comprise multiple duplicated encoder units that can be generated by network augmentation system 102 and/or network augmentation component 108 as described above with reference to FIG. 2.

In the example embodiment depicted in FIG. 3, network 300 illustrates another example of how network augmentation system 102 (e.g., via network augmentation component 108) can combine output data (e.g., latent space output data) from different layers of an artificial neural network (e.g., a 2D ML and/or AI network) that has been trained on static image data (e.g., single and/or static 2D images). In this example embodiment, such combination is represented by addition symbol 206 depicted as "+" in FIG. 3.

As illustrated in the example embodiment depicted in FIG. 3, the above described combination of output data (e.g., latent space output data) from different layers of an artificial neural network (e.g., a 2D ML and/or AI network) that has been trained on static image data (e.g., single and/or static 2D images) can be performed by network augmentation system 102 and/or network augmentation component 108 at one or more layers positioned before the output layer of encoder 202. For instance, in this example embodiment, as represented by addition symbol 206, network augmentation system 102 and/or network augmentation component 108 can perform such combination at a layer positioned one level before the output layer of encoder 202. In this example embodiment, network 300 can therefore constitute a one level pre-encoder combined network.

In some embodiments, network augmentation system 102 and/or network augmentation component 108 can combine output data (e.g., latent space output data) from two or more encoder units of encoder 202. For instance, in the example embodiment depicted in FIG. 3, network augmentation system 102 and/or network augmentation component 108 can combine output data (e.g., latent space output data) from four encoder units of encoder 202 in network 300. In this example embodiment, network augmentation system 102 and/or network augmentation component 108 can combine output data (e.g., latent space output data) from the four encoder units of encoder 202 that respectively receive image instances 208a, 208b, 208c, and 208d, as represented by addition symbol 206 in FIG. 3. In this example embodiment, based on the above described combination of output data (e.g., latent space output data) from different layers and/or different encoder units of encoder 202, network augmentation system 102 and/or network application component 110 can use such combined output data as input to one or more subsequent layers of encoder 202 (e.g., as input to the output layer of encoder 202) and/or as input to decoder 204 to infer an outcome from one or more of image instances 208a, 208b, 208c, 208d, 208e in accordance with one or more embodiments described herein.

Figure 4:
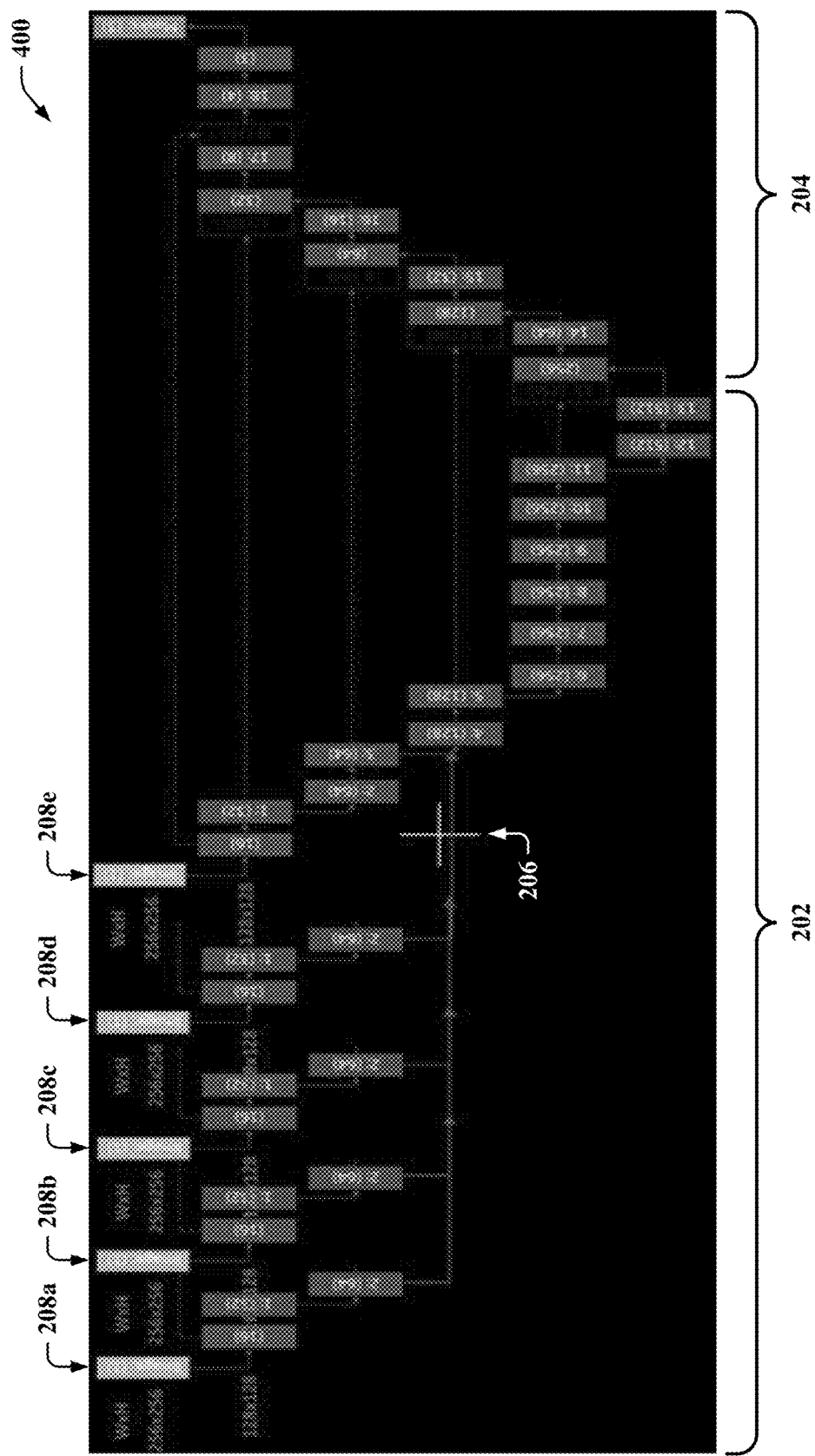

FIG. 4 illustrates an example, non-limiting network 400 that can facilitate temporalizing and/or spatializing a machine learning and/or artificial intelligence network in accordance with one or more embodiments described herein. Repetitive description of like elements and/or processes employed in respective embodiments is omitted for sake of brevity.

In the example embodiment depicted in FIG. 4, network 400 can comprise an artificial neural network (e.g., a 2D ML and/or AI network) that has been trained on static image data (e.g., single and/or static 2D images). For instance, in this example embodiment, network 400 can comprise an encoder-decoder neural network that has been trained on static image data (e.g., single and/or static 2D images). Network 400 illustrated in the example embodiment depicted in FIG. 4 can comprise an example, non-limiting alternative embodiment of network 300 described above and illustrated in FIG. 3. As illustrated in the example embodiment depicted in FIG. 4, network 400 can comprise encoder 202 and decoder 204, where encoder 202 can comprise multiple duplicated encoder units that can be generated by network augmentation system 102 and/or network augmentation component 108 as described above with reference to FIG. 2.

In the example embodiment depicted in FIG. 4, network 400 illustrates another example of how network augmentation system 102 (e.g., via network augmentation component 108) can combine output data (e.g., latent space output data) from different layers of an artificial neural network (e.g., a 2D ML and/or AI network) that has been trained on static image data (e.g., single and/or static 2D images). In this example embodiment, such combination is represented by addition symbol 206 depicted as "+" in FIG. 4.

As illustrated in the example embodiment depicted in FIG. 4, the above described combination of output data (e.g., latent space output data) from different layers of an artificial neural network (e.g., a 2D ML and/or AI network) that has been trained on static image data (e.g., single and/or static 2D images) can be performed by network augmentation system 102 and/or network augmentation component 108 at one or more layers positioned before the output layer of encoder 202. For instance, in this example embodiment, as represented by addition symbol 206, network augmentation system 102 and/or network augmentation component 108 can perform such combination at a layer positioned two levels before the output layer of encoder 202. In this example embodiment, network 300 can therefore constitute a two level pre-encoder combined network.

In some embodiments, network augmentation system 102 and/or network augmentation component 108 can combine output data (e.g., latent space output data) from two or more encoder units of encoder 202. For instance, in the example embodiment depicted in FIG. 4, network augmentation system 102 and/or network augmentation component 108 can combine output data (e.g., latent space output data) from four encoder units of encoder 202 in network 400. In this example embodiment, network augmentation system 102 and/or network augmentation component 108 can combine output data (e.g., latent space output data) from the four encoder units of encoder 202 that respectively receive image instances 208a, 208b, 208c, and 208d, as represented by addition symbol 206 in FIG. 4. In this example embodiment, based on the above described combination of output data (e.g., latent space output data) from different layers and/or different encoder units of encoder 202, network augmentation system 102 and/or network application component 110 can use such combined output data as input to one or more subsequent layers of encoder 202 (e.g., as input to the output layer of encoder 202) and/or as input to decoder 204 to infer an outcome from one or more of image instances 208a, 208b, 208c, 208d, 208e in accordance with one or more embodiments described herein.

Figure 5A:
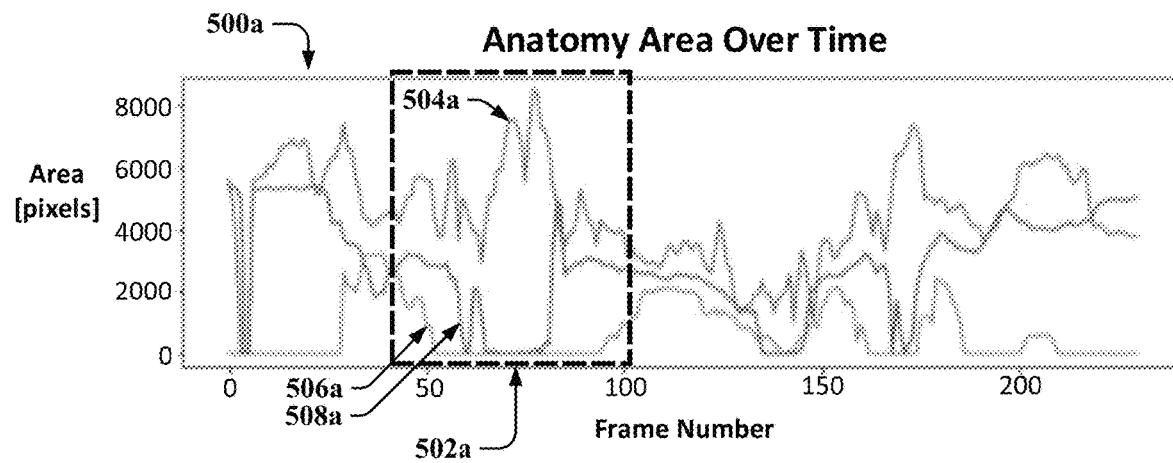
FIGS. 5A and 5B respectively illustrate example, non-limiting experimental results data that can be obtained from implementing one or more existing technologies and one or more embodiments described herein, respectively, to infer an outcome from an image instance in a sequence of images.
Figure 5B:
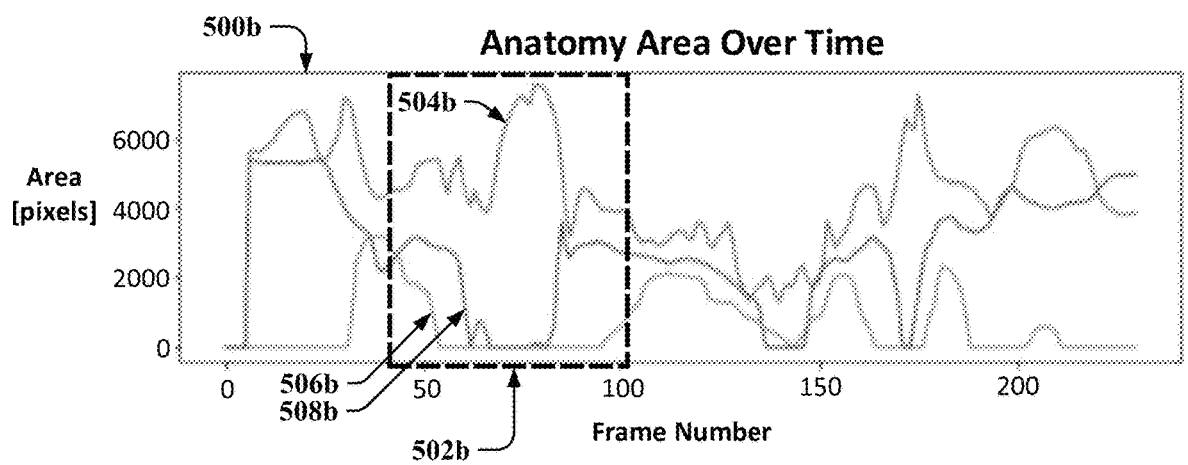

FIGS. 5A and 5B respectively illustrate example, non-limiting experimental results data 500a, 500b that can be obtained from implementing one or more existing technologies and one or more embodiments described herein, respectively, to infer an outcome from an image instance in a sequence of images. Repetitive description of like elements and/or processes employed in respective embodiments is omitted for sake of brevity.

Experimental results data 500a can be obtained from implementing one or more existing technologies (e.g., prior art) to infer an outcome from an image instance in a sequence of images. For example, experimental results data 500a can be obtained from implementing an artificial neural network (e.g., a 2D ML and/or AI network), that has been trained on static image data (e.g., single and/or static 2D images), to infer an outcome from an image instance in a sequence of images (e.g., to infer an outcome from a video frame in a sequence of video frames (e.g., a video) and/or to infer an outcome from a cross-sectional image (e.g., a slice)

of a volume (e.g., an object) captured in, for instance, a CT image, an MR image, a PET image, and/or another image). In the example depicted in FIG. 5A, experimental results data 500a can be obtained from implementing an artificial neural network (e.g., a 2D ML and/or AI network), that has been trained on static image data (e.g., single and/or static 2D images), to infer an outcome from an image instance in a sequence of images of a biological component of an entity (e.g., an anatomy component (e.g., heart, lung, kidney, gallbladder (GB), liver, and/or another anatomy component) of a human, for example). For instance, in the example depicted in FIG. 5A: plot 504a of experimental results data 500a can correspond to a sequence of images of a liver; plot 506a of experimental results data 500a can correspond to a sequence of images of a gallbladder; and/or plot 508a of experimental results data 500a can correspond to a sequence of images of a kidney.

Experimental results data 500b can be obtained from implementing one or more embodiments described herein to infer an outcome from an image instance in a sequence of images. For example, experimental results data 500b a can be obtained from implementing network 200 described above and illustrated in the example embodiment depicted in FIG. 2 to infer an outcome from an image instance in a sequence of images (e.g., to infer an outcome from a video frame in a sequence of video frames (e.g., a video) and/or to infer an outcome from a cross-sectional image (e.g., a slice) of a volume (e.g., an object) captured in, for instance, a CT image, an MR image, a PET image, and/or another image). In the example depicted in FIG. 5B, experimental results data 500b can be obtained from implementing network 200 described above and illustrated in the example embodiment depicted in FIG. 2 to infer an outcome from an image instance in a sequence of images of a biological component of an entity (e.g., an anatomy component (e.g., heart, lung, kidney, gallbladder (GB), liver, and/or another anatomy component) of a human, for example). For instance, in the example depicted in FIG. 5B: plot 504b of experimental results data 500b can correspond to a sequence of images of a liver; plot 506b of experimental results data 500b can correspond to a sequence of images of a gallbladder; and/or plot 508b of experimental results data 500b can correspond to a sequence of images of a kidney.

By comparing plots 504a, 506a, 508a in section 502a of experimental results data 500a to plots 504b, 506b, 508b in section 502b of experimental results data 500b, it should be appreciated that plots 504b, 506b, 508b, which can be generated using network 200 in accordance with one or more embodiments described herein, provide regions with distinct relative improvement (e.g., relatively smoother response) with respect to the area (e.g., measured in pixels) of the biological component over time compared to plots 504a, 506a, 508a. In comparing plots 504a, 506a, 508a to plots 504b, 506b, 508b, it should also be appreciated that using network 200 in accordance with one or more embodiments described herein to infer an outcome from an image instance in a sequence of images can yield temporalized network predictions that are robust to relatively small changes and hence produce relatively smooth outputs with relatively smooth transitions.

Figure 6A:
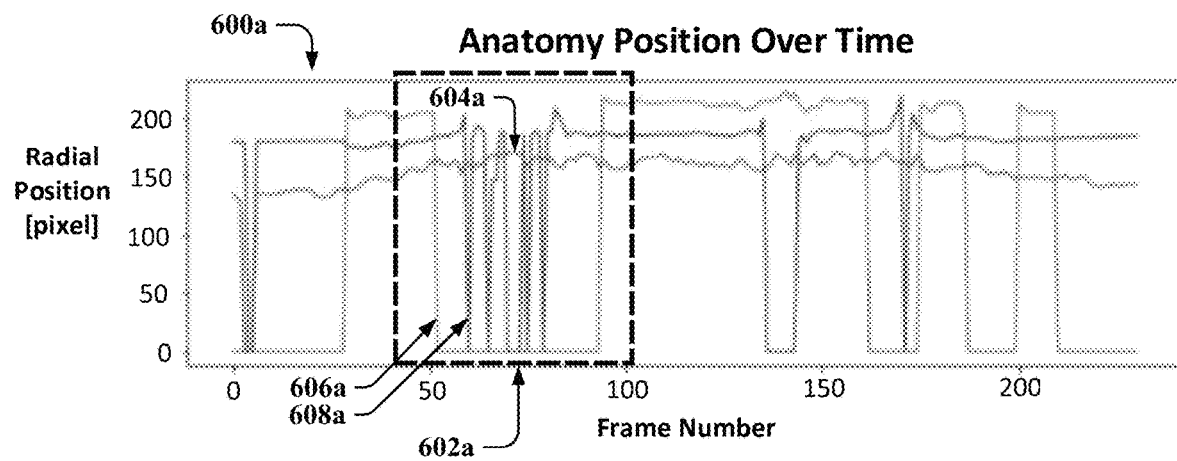
FIGS. 6A and 6B respectively illustrate example, non-limiting experimental results data that can be obtained from implementing one or more existing technologies and one or more embodiments described herein, respectively, to infer an outcome from an image instance in a sequence of images.
Figure 6B:
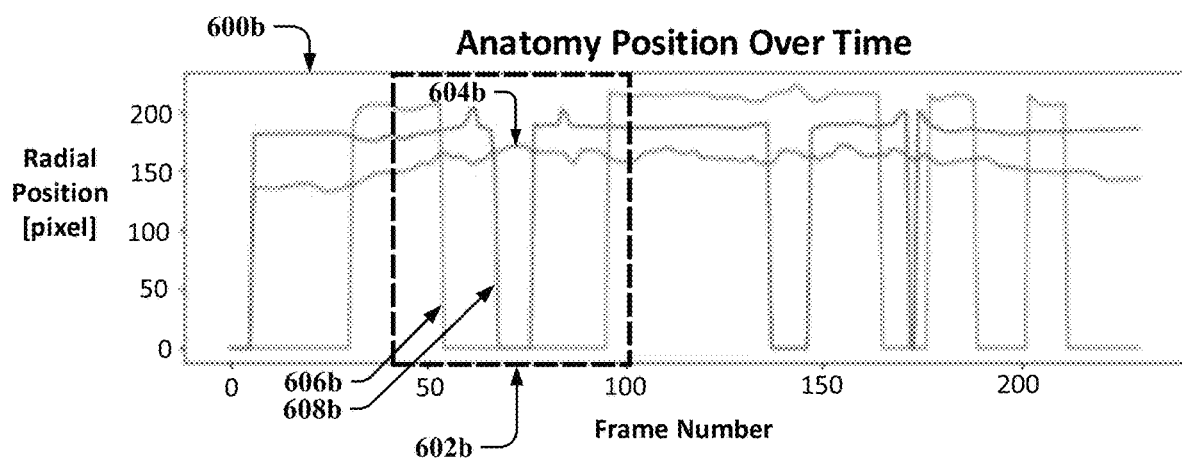

FIGS. 6A and 6B respectively illustrate example, non-limiting experimental results data 600a, 600b that can be obtained from implementing one or more existing technologies and one or more embodiments described herein, respectively, to infer an outcome from an image instance in a sequence of images. Repetitive description of like elements and/or processes employed in respective embodiments is omitted for sake of brevity.

Experimental results data 600a can be obtained from implementing one or more existing technologies (e.g., prior art) to infer an outcome from an image instance in a sequence of images. For example, experimental results data 600a can be obtained from implementing an artificial neural network (e.g., a 2D ML and/or AI network), that has been trained on static image data (e.g., single and/or static 2D images), to infer an outcome from an image instance in a sequence of images (e.g., to infer an outcome from a video frame in a sequence of video frames (e.g., a video) and/or to infer an outcome from a cross-sectional image (e.g., a slice) of a volume (e.g., an object) captured in, for instance, a CT image, an MR image, a PET image, and/or another image). In the example depicted in FIG. 6A, experimental results data 600a can be obtained from implementing an artificial neural network (e.g., a 2D ML and/or AI network), that has been trained on static image data (e.g., single and/or static 2D images), to infer an outcome from an image instance in a sequence of images of a biological component of an entity (e.g., an anatomy component (e.g., heart, lung, kidney, gallbladder (GB), liver, and/or another anatomy component) of a human, for example). For instance, in the example depicted in FIG. 6A: plot 604a of experimental results data 600a can correspond to a sequence of images of a liver; plot 606a of experimental results data 600a can correspond to a sequence of images of a gallbladder; and/or plot 608a of experimental results data 600a can correspond to a sequence of images of a kidney.

Experimental results data 600b can be obtained from implementing one or more embodiments described herein to infer an outcome from an image instance in a sequence of images. For example, experimental results data 600b a can be obtained from implementing network 200 described above and illustrated in the example embodiment depicted in FIG. 2 to infer an outcome from an image instance in a sequence of images (e.g., to infer an outcome from a video frame in a sequence of video frames (e.g., a video) and/or to infer an outcome from a cross-sectional image (e.g., a slice) of a volume (e.g., an object) captured in, for instance, a CT image, an MR image, a PET image, and/or another image). In the example depicted in FIG. 6B, experimental results data 600b can be obtained from implementing network 200 described above and illustrated in the example embodiment depicted in FIG. 2 to infer an outcome from an image instance in a sequence of images of a biological component of an entity (e.g., an anatomy component (e.g., heart, lung, kidney, gallbladder (GB), liver, and/or another anatomy component) of a human, for example). For instance, in the example depicted in FIG. 6B: plot 604b of experimental results data 600b can correspond to a sequence of images of a liver; plot 606b of experimental results data 600b can correspond to a sequence of images of a gallbladder; and/or plot 608b of experimental results data 600b can correspond to a sequence of images of a kidney.

By comparing plots 604a, 606a, 608a in section 602a of experimental results data 600a to plots 604b, 606b, 608b in section 602b of experimental results data 600b, it should be appreciated that plots 604b, 606b, 608b, which can be generated using network 200 in accordance with one or more embodiments described herein, provide regions with distinct relative improvement (e.g., relatively smoother response) with respect to the position (e.g., radial position measured in pixels) of the biological component over time compared to plots 604a, 606a, 608a. In comparing plots 604a, 606a, 608a to plots 604b, 606b, 608b, it should also be appreciated that using network 200 in accordance with one or more embodiments described herein to infer an outcome from an image instance in a sequence of images can yield temporalized network predictions that are robust to relatively small changes and hence produce relatively smooth outputs with relatively smooth transitions.

Figure 7:
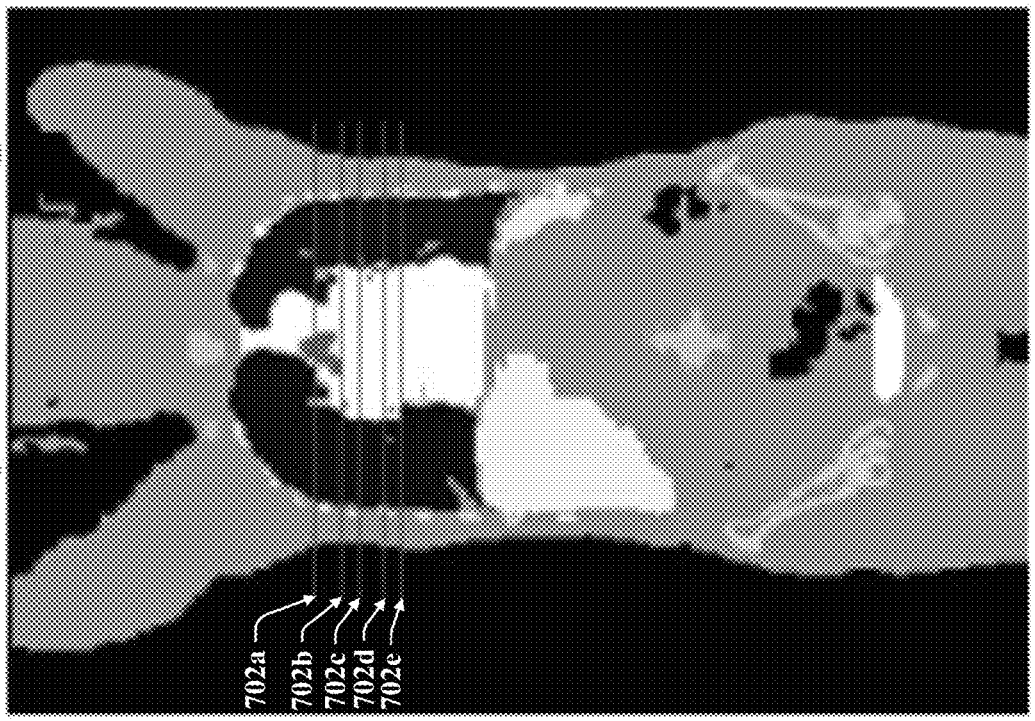
FIG. 7 illustrates an example, non-limiting image from which one or more image instances can be extracted and used as input to a machine learning and/or artificial intelligence network that has been temporalized and/or spatialized in accordance with one or more embodiments described herein.

FIG. 7 illustrates an example, non-limiting image 700 from which one or more image instances can be extracted and used as input to a machine learning and/or artificial intelligence network that has been temporalized and/or spatialized in accordance with one or more embodiments described herein. Repetitive description of like elements and/or processes employed in respective embodiments is omitted for sake of brevity.

In the example embodiment depicted in FIG. 7, image 700 can comprise a CT image. In this example embodiment, one or more image instances can be extracted and used as input to a machine learning and/or artificial intelligence network that has been temporalized and/or spatialized in accordance with one or more embodiments described herein. For example, as illustrated in the example embodiment depicted in FIG. 7, image instances 702a, 702b, 702c, 702d, 702e can comprise cross-sectional and/or axial images (e.g., slices) that can be extracted from image 700 and used as input to an artificial neural network (e.g., a 2D ML and/or AI network) that has been trained on static image data (e.g., single and/or static 2D images) and temporalized and/or spatialized in accordance with one or more embodiments described herein. For instance, image instances 702a, 702b, 702c, 702d, 702e can comprise cross-sectional and/or axial images (e.g., slices) that can be extracted from image 700 and input (e.g., via a GUI of network augmentation system 102) to respective duplicated encoder units of encoder 202 in network 200, where network 200 has been trained on static image data (e.g., single and/or static 2D images) and temporalized and/or spatialized as described above and illustrated in FIG. 2. In this example, based on inputting (e.g., via a GUI of network augmentation system 102) image instances 702a, 702b, 702c, 702d, 702e into respective duplicated encoder units of encoder 202 in network 200, network augmentation system 102 and/or network augmentation component 108 can combine output data (e.g., latent space output data) from different layers of network 200 as described above and illustrated in FIG. 2. In this example, based on such combining of output data (e.g., latent space output data) from different layers of network 200, network augmentation system 102 and/or network application component 110 can infer an outcome from, for instance, one or more image instances in image instances 702a, 702b, 702c, 702d, 702e as described above and illustrated in FIG. 2.

Figure 8:
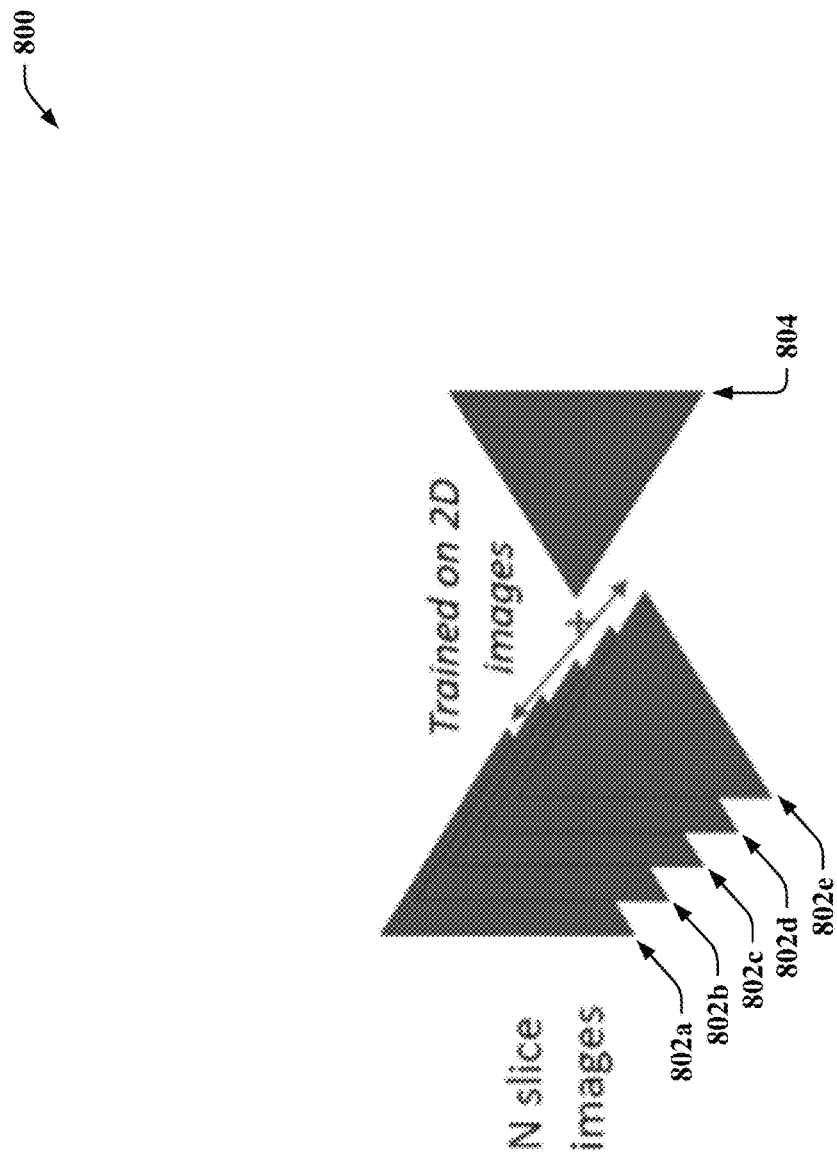
FIG. 8 illustrates an example, non-limiting network that can facilitate temporalizing and/or spatializing a machine learning and/or artificial intelligence network in accordance with one or more embodiments described herein.

FIG. 8 illustrates an example, non-limiting network 800 that can facilitate temporalizing and/or spatializing a machine learning and/or artificial intelligence network in accordance with one or more embodiments described herein. Repetitive description of like elements and/or processes employed in respective embodiments is omitted for sake of brevity.

In the example embodiment depicted in FIG. 8, network 800 can comprise an artificial neural network (e.g., a 2D ML and/or AI network) that has been trained on static image data (e.g., single and/or static 2D images). For instance, in this example embodiment, network 800 can comprise an encoder-decoder neural network that has been trained on static image data (e.g., single and/or static 2D images). Network 800 illustrated in the example embodiment depicted in FIG. 8 can comprise an example, non-limiting alternative embodiment of network 200 described above and illustrated in FIG. 2, where network 800 can comprise the same structure and/or functionality as that of network 200.

As illustrated in the example embodiment depicted in FIG. 8, network 800 can comprise duplicated encoder units 802a, 802b, 802c, 802d, 802e and a decoder 804, where duplicated encoder units 802a, 802b, 802c, 802d, 802e can be generated by network augmentation system 102 and/or network augmentation component 108 as described above with reference to FIG. 2. In the example embodiment depicted in FIG. 8, duplicated encoder units 802a, 802b, 802c, 802d, 802e can each receive as input (e.g., via a GUI of network augmentation system 102) a different image instance (e.g., N slice images can be input to duplicated encoder units 802a, 802b, 802c, 802d, 802e as denoted in FIG. 8). For example, duplicated encoder units 802a, 802b, 802c, 802d, 802e can respectively receive as input (e.g., via a GUI of network augmentation system 102) image instances 208a, 208b, 208c, 208d, 208e, image instances 702a, 702b, 702c, 702d, 702e, and/or other image instances. In this example, based on such respective receipt of such image instances by duplicated encoder units 802a, 802b, 802c, 802d, 802e of network 800, network augmentation system 102 and/or network augmentation component 108 can combine output data (e.g., latent space output data) from different layers of network 800 (e.g., as described above in the example embodiments illustrated in FIGS. 2, 3, and/or 4). In this example, based on such combining of output data (e.g., latent space output data) from different layers of network 800, network augmentation system 102 and/or network application component 110 can infer an outcome (e.g., using decoder 804 of network 800 and as described above in the example embodiments illustrated in FIGS. 2, 3, and/or 4) from, for instance, one or more of the above defined image instances that can be respectively received by duplicated encoder units 802a, 802b, 802c, 802d, 802e of network 800.

Figure 9A:
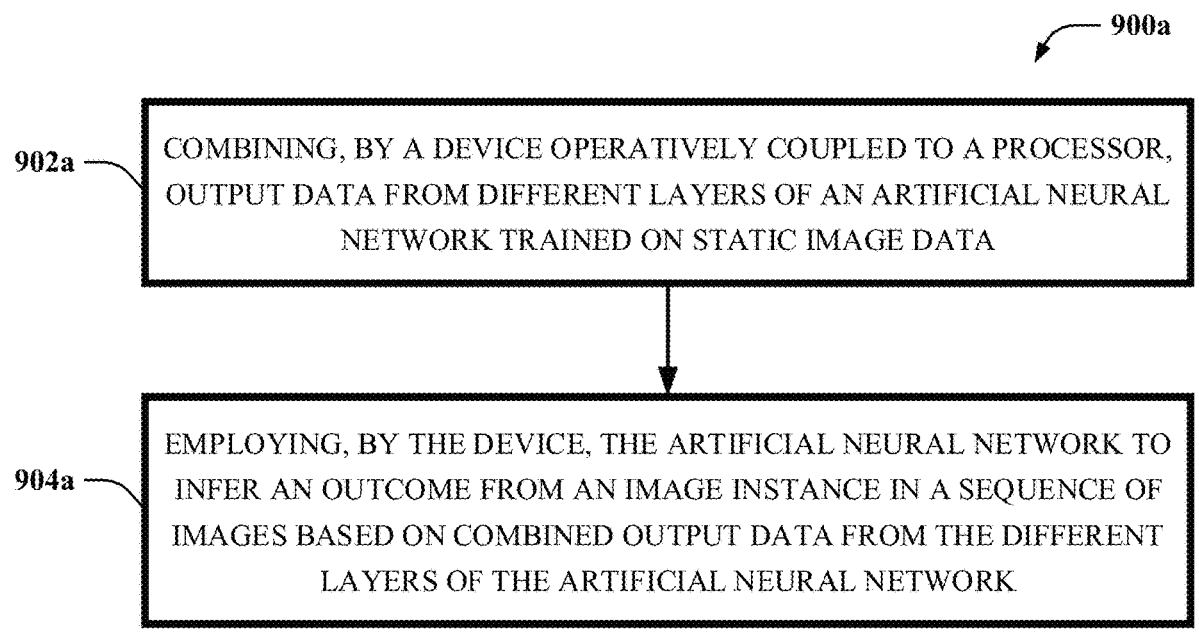

FIG. 9A illustrates a flow diagram of an example, non-limiting computer-implemented method 900a that can facilitate temporalizing and/or spatializing a machine learning and/or artificial intelligence network in accordance with one or more embodiments described herein. Repetitive description of like elements and/or processes employed in respective embodiments is omitted for sake of brevity.

At 902a, computer-implemented method 900a can comprise combining, by a device (e.g., via network augmentation system 102 and/or network augmentation component 108) operatively coupled to a processor (e.g., processor 106), output data from different layers of an artificial neural network trained on static image data.

At 904a, computer-implemented method 900a can comprise employing, by the device (e.g., via network augmentation system 102 and/or network application component 110), the artificial neural network to infer an outcome from an image instance in a sequence of images based on combined output data from the different layers of the artificial neural network.

FIG. 9B illustrates a flow diagram of an example, non-limiting computer-implemented method 900b that can facilitate temporalizing and/or spatializing a machine learning and/or artificial intelligence network in accordance with one or more embodiments described herein. Repetitive description of like elements and/or processes employed in respective embodiments is omitted for sake of brevity.

At 902b, computer-implemented method 900b can comprise taking, by a device (e.g., via network augmentation system 102 and/or network augmentation component 108)

operatively coupled to a processor (e.g., processor 106), a pretrained artificial neural network that infers on low dimensional data, duplicating, by the device, the pretrained artificial neural network until a certain layer to generate one or more duplicate units of the pretrained artificial neural network, combining, by the device, output from the one or more duplicate units after the certain layer, and providing, by the device, combined output from the one or more duplicate units to at least one portion of the pretrained artificial neural network.

At 904*b*, computer-implemented method 900*b* can comprise employing, by the device (e.g., via network augmentation system 102 and/or network application component 110), the pretrained artificial neural network to infer an outcome from a higher dimensional data that is reduced into a set of lower dimensional data, each of which is input to the one or more duplicate units.

Network augmentation system 102 can be associated with various technologies. For example, network augmentation system 102 can be associated with machine learning (ML) technologies, artificial intelligence (AI) technologies, augmentation of ML and/or AI network technologies, cloud computing technologies, Internet of Things (IoT) technologies, and/or other technologies.

Network augmentation system 102 can provide technical improvements to systems, devices, components, operational steps, and/or processing steps associated with the various technologies identified above. For example, network augmentation system 102 can combine output data (e.g., latent space output data) from different layers of an artificial neural network (e.g., a 2D ML and/or AI network) trained on static image data (e.g., single and/or static 2D images); and/or employ the artificial neural network to infer an outcome from an image instance in a sequence of images (e.g., temporal and/or spatial images) based on combined output data from the different layers of the artificial neural network. In this example, for a given network (e.g., a 2D ML and/or AI network) that has been trained on static image data (e.g., single and/or static 2D images), network augmentation system 102 can enlarge the context of a sequence of images (e.g., frames of a video and/or cross-sectional slices of a 3D volume in, for instance, a CT image, an MR image, and/or a PET image) to include temporal (e.g., time) and/or spatial (e.g., volume) information, such that the process of retraining the network to infer an outcome on one or more image instances in the sequence of images is eliminated. In this example, by combining latent space outputs of multiple images input to a given network (e.g., a 2D ML and/or AI network) that has been trained on static image data (e.g., single and/or static 2D images), network augmentation system 102 can enable such a network to thereby become relatively more robust and/or more stable compared to another network (e.g., another 2D ML and/or AI network) trained on static image data, as such a given network can use redundant information from multiple similar images to infer on any single image instance in a sequence of images. In this example, network augmentation system 102 can enable the size of such a given network to remain relatively compact, as the addition of new weights can be eliminated. That is, for example, no new weights are added by network augmentation system 102 to such a given network.

In another example, network augmentation system 102 can enable higher dimensional inferencing from lower dimensional networks. For instance, network augmentation system 102 can combine output data (e.g., latent space output data) from different layers of an artificial neural network (e.g., a 2D ML and/or AI network) that has been trained on static image data (e.g., single and/or static 2D images), where such training is on N dimensions. In this example, network augmentation system 102 can further employ the artificial neural network to infer an outcome from an image instance in a sequence of images (e.g., frames of a video and/or cross-sectional slices of a 3D volume in, for instance, a CT image, an MR image, and/or a PET image) based on combined output data from the different layers of the artificial neural network, where such an outcome inference is made on N+1 dimensions from the sequence of images (e.g., a temporal dimension, a spatial dimension, and/or another dimension).

Network augmentation system 102 can provide technical improvements to a processing unit (e.g., processor 106, a quantum processor, and/or another processor) associated with network augmentation system 102. For example, as described above, given an artificial neural network (e.g., a 2D ML and/or AI network) that has been trained on static image data (e.g., single and/or static 2D images), by enlarging the context of a sequence of images (e.g., frames of a video and/or cross-sectional slices of a 3D volume in, for instance, a CT image, an MR image, and/or a PET image) to include temporal (e.g., time) and/or spatial (e.g., volume) information, network augmentation system 102 can thereby eliminate the process of retraining the network to infer an outcome on one or more image instances in the sequence of images. In this example, by eliminating the process of retraining the network to infer an outcome on one or more image instances in the sequence of images, network augmentation system 102 can thereby reduce the processing workload of a processing unit (e.g., processor 106) that would otherwise execute such retraining. In this example, by reducing the processing workload of such a processing unit (e.g., processor 106), network augmentation system 102 can further improve the efficiency and/or performance of the processing unit, as well as reduce computational costs of the processing unit.

Network augmentation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, and/or another type of specialized computer) to execute defined tasks related to the various technologies identified above. Network augmentation system 102 and/or components thereof, can be employed to solve new problems that arise through advancements in technologies mentioned above, employment of quantum computing systems, cloud computing systems, computer architecture, and/or another technology.

It is to be appreciated that network augmentation system 102 can utilize various combinations of electrical components, mechanical components, and circuitry that cannot be replicated in the mind of a human or performed by a human, as the various operations that can be executed by network augmentation system 102 and/or components thereof as described herein are operations that are greater than the capability of a human mind. For instance, the amount of data processed, the speed of processing such data, or the types of data processed by network augmentation system 102 over a certain period of time can be greater, faster, or different than the amount, speed, or data type that can be processed by a human mind over the same period of time.

According to several embodiments, network augmentation system 102 can also be fully operational towards performing one or more other functions (e.g., fully powered on, fully executed, and/or another function) while also performing the various operations described herein. It should be appreciated that such simultaneous multi-operational execution is beyond the capability of a human mind. It should also be appreciated that network augmentation system 102 can include information that is impossible to obtain manually by an entity, such as a human user. For example, the type, amount, and/or variety of information included in network augmentation system 102, network augmentation component 108, and/or network application component 110 can be more complex than information obtained manually by a human user.

Figure 10:
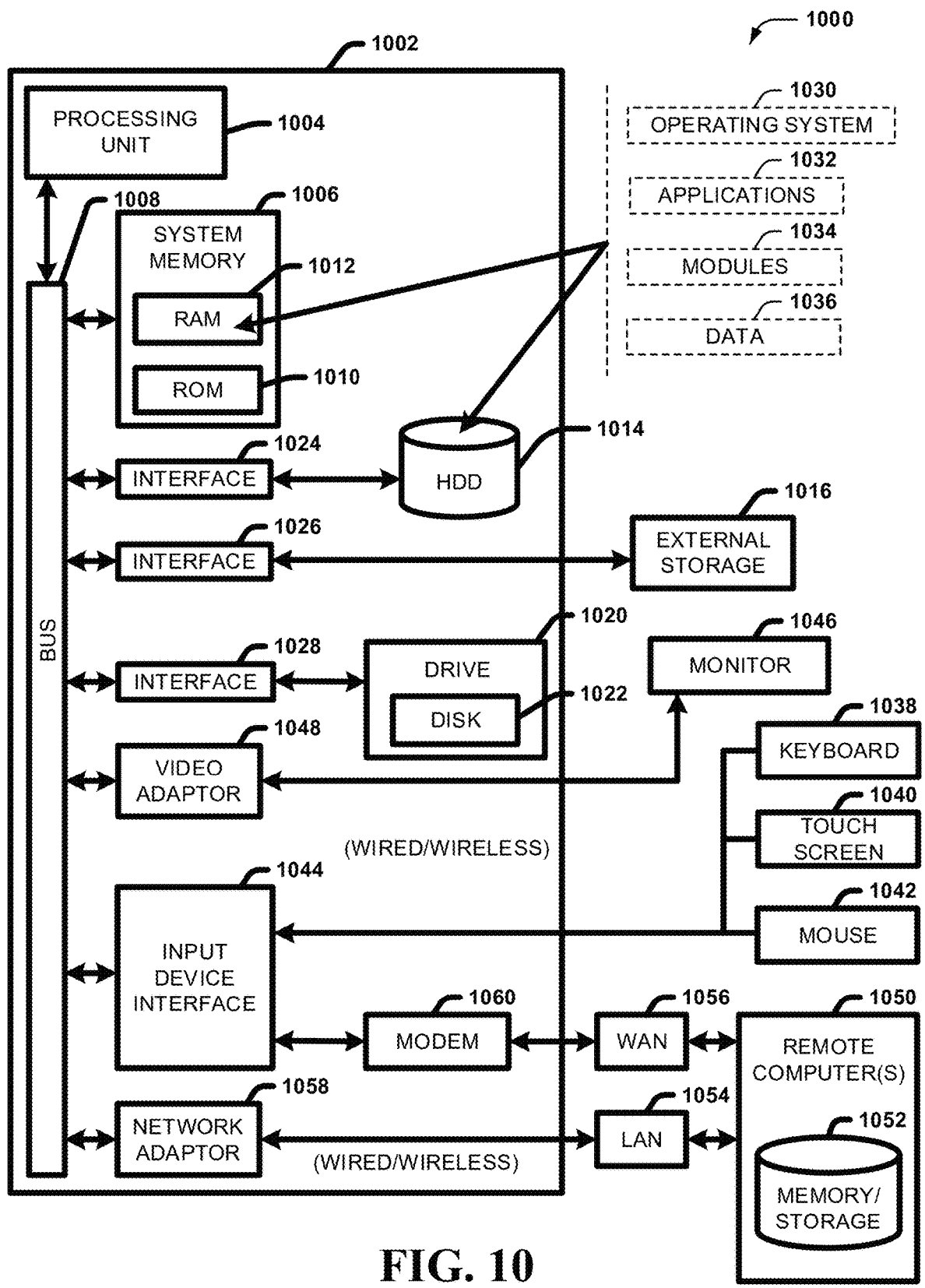
FIG. 10 illustrates a block diagram of an example, non-limiting operating environment in which one or more embodiments described herein can be facilitated.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and a drive 1020, e.g., such as a solid state drive, an optical disk drive, which can read or write from a disk 1022, such as a CD-ROM disc, a DVD, a BD, etc. Alternatively, where a solid state drive is involved, disk 1022 would not be included, unless separate. While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and drive 1020 can be connected to the system bus 1008 by an HDD interface 1024, an external storage interface 1026 and a drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above, such as but not limited to a network virtual machine providing one or more aspects of storage or processing of information. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
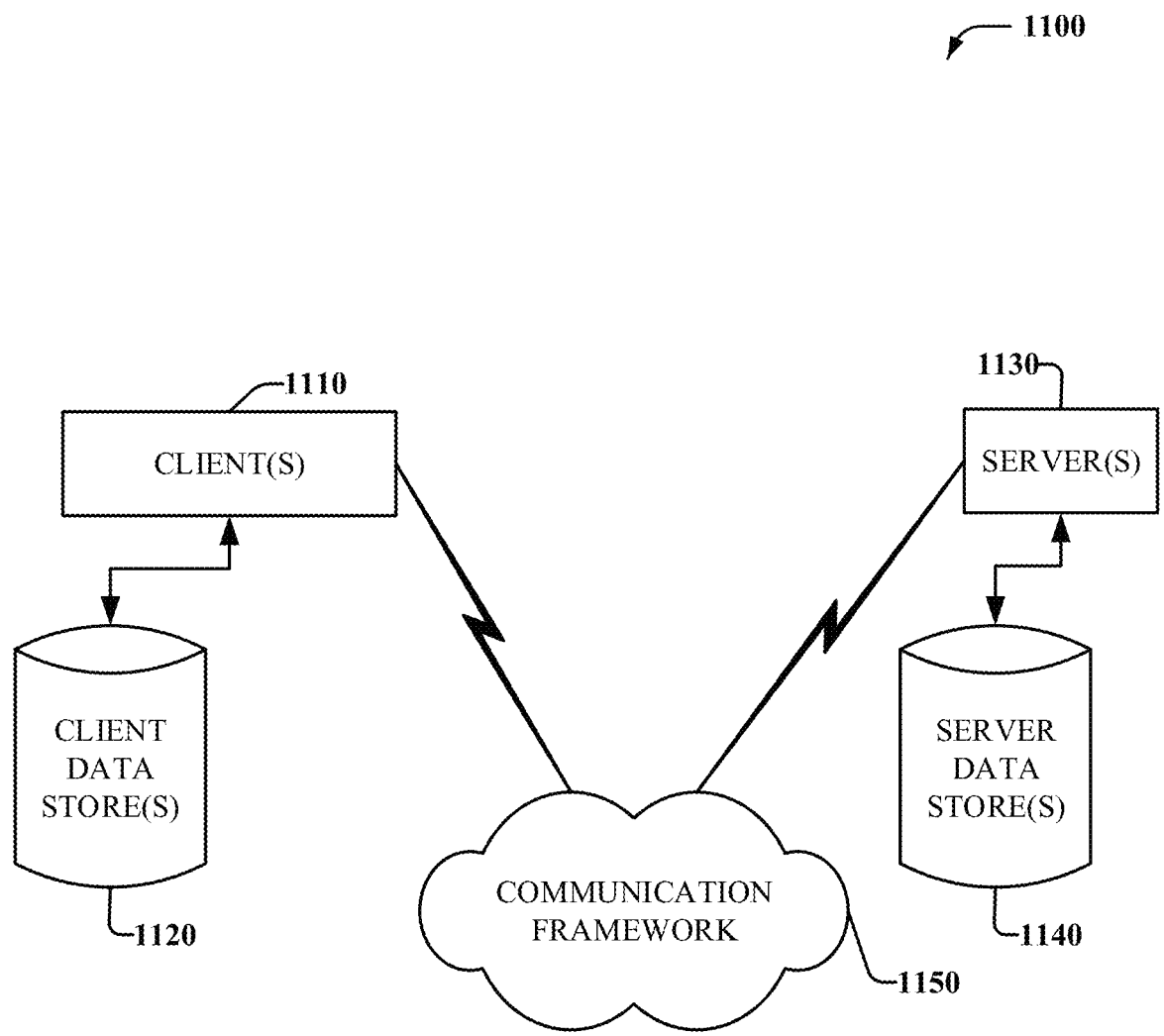
FIG. 11 illustrates an example networking environment operable to execute various implementations described herein.

FIG. 11 is a schematic block diagram of a sample computing environment 1100 with which the disclosed subject matter can interact. The sample computing environment 1100 includes one or more client(s) 1110. The client(s) 1110 can be hardware and/or software (e.g., threads, processes, computing devices). The sample computing environment 1100 also includes one or more server(s) 1130. The server(s) 1130 can also be hardware and/or software (e.g., threads, processes, computing devices). The servers 1130 can house threads to perform transformations by employing one or more embodiments as described herein, for example. One possible communication between a client 1110 and a server 1130 can be in the form of a data packet adapted to be transmitted between two or more computer processes. The sample computing environment 1100 includes a communication framework 1150 that can be employed to facilitate communications between the client(s) 1110 and the server(s) 1130. The client(s) 1110 are operably connected to one or more client data store(s) 1120 that can be employed to store information local to the client(s) 1110. Similarly, the server(s) 1130 are operably connected to one or more server data store(s) 1140 that can be employed to store information local to the servers 1130.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DR-RAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further aspects of various embodiments of the subject claimed innovation are provided in the subject matter that follows:

1. A system, comprising: a processor that executes computer-executable components stored in a computer-readable memory, the computer-executable components comprising: a network augmentation component that combines output data from different layers of an artificial neural network trained on static image data; and a network application component that employs the artificial neural network to infer an outcome from an image instance in a sequence of images based on combined output data from the different layers of the artificial neural network.

2. The system of any preceding clause, wherein the sequence of images comprises at least one of: a sequence of static images; a sequence of temporal images; a sequence of video frames; or a sequence of spatial images.

3. The system of any preceding clause, wherein the combined output data comprises combined latent space output data of multiple image instances in the sequence of images.

4. The system of any preceding clause, wherein the different layers of the artificial neural network comprise at least one of: different input layers of the artificial neural network; different latent variables layers of the artificial neural network; or different output layers of the artificial neural network.

5. The system of any preceding clause, wherein the network augmentation component combines the output data from the different layers of the artificial neural network at one or more combination points defined in the artificial neural network, and wherein the one or more combination points are defined by an entity.

6. The system of any preceding clause, wherein the network augmentation component averages the output data from the different layers of the artificial neural network to generate the combined output data.

7. The system of any preceding clause, wherein the network augmentation component combines the output data from the different layers of the artificial neural network to provide at least one of temporal context data or spatial context data that is used to infer the outcome from the image instance in the sequence of images and to eliminate retraining of the artificial neural network to infer the outcome from the image instance in the sequence of images.

8. A computer-implemented method, comprising: combining, by a device operatively coupled to a processor, output data from different layers of an artificial neural network trained on static image data; and employing, by the device, the artificial neural network to infer an outcome from an image instance in a sequence of images based on combined output data from the different layers of the artificial neural network.

9. The computer-implemented method of any preceding clause, wherein the sequence of images comprises at least one of: a sequence of static images; a sequence of temporal images; a sequence of video frames; or a sequence of spatial images.

10. The computer-implemented method of any preceding clause, wherein the combined output data comprises combined latent space output data of multiple image instances in the sequence of images.

11. The computer-implemented method of any preceding clause, wherein the different layers of the artificial neural network comprise at least one of: different input layers of the artificial neural network; different latent variables layers of the artificial neural network; or different output layers of the artificial neural network.

12. The computer-implemented method of any preceding clause, further comprising: combining, by the device, the output data from the different layers of the artificial neural network at one or more combination points defined in the artificial neural network, wherein the one or more combination points are defined by an entity.

13. The computer-implemented method of any preceding clause, further comprising: averaging, by the device, the output data from the different layers of the artificial neural network to generate the combined output data.

14. The computer-implemented method of any preceding clause, further comprising: combining, by the device, the output data from the different layers of the artificial neural network to provide at least one of temporal context data or spatial context data that is used to infer the outcome from the image instance in the sequence of images and to eliminate retraining of the artificial neural network to infer the outcome from the image instance in the sequence of images.

15. A computer program product that facilitates temporalizing or spatializing a machine learning and/or artificial intelligence network, the computer program product comprising a computer-readable memory having program instructions embodied therewith, the program instructions executable by a processor to cause the processor to: combine output data from different layers of an artificial neural network trained on static image data; and employ the artificial neural network to infer an outcome from an image instance in a sequence of images based on combined output data from the different layers of the artificial neural network.

16. The computer program product of any preceding clause, wherein the sequence of images comprises at least one of: a sequence of static images; a sequence of temporal images; a sequence of video frames; or a sequence of spatial images.

17. The computer program product of any preceding clause, wherein the combined output data comprises combined latent space output data of multiple image instances in the sequence of images.

18. The computer program product of any preceding clause, wherein the different layers of the artificial neural network comprise at least one of: different input layers of the artificial neural network; different latent variables layers of the artificial neural network; or different output layers of the artificial neural network.

19. The computer program product of any preceding clause, wherein the program instructions are further executable to cause the processor to: combine the output data from the different layers of the artificial neural network at one or more combination points defined in the artificial neural network, wherein the one or more combination points are defined by an entity.

20. The computer program product of any preceding clause, wherein the program instructions are further executable to cause the processor to: average the output data from the different layers of the artificial neural network to generate the combined output data.

What is claimed is:

1. A system, comprising:
    a processor that executes computer-executable components stored in a computer-readable memory, the computer-executable components comprising:
        a network augmentation component that:
            takes a pretrained artificial neural network that is configured to perform an inferencing task on a two-dimensional image;
            duplicates, without retraining, an encoder unit of the pretrained artificial neural network one or more times, thereby yielding a plurality of duplicates of the encoder unit of the pretrained artificial neural network, wherein the plurality of duplicates of the encoder unit are arranged in parallel with each other;
            combines output from the plurality of duplicates of the encoder unit; and
            provides combined output from the plurality of duplicates of the encoder unit to a decoder unit of the pretrained artificial neural network; and
        a network application component that employs the pretrained artificial neural network to perform the inferencing task on a stack of two-dimensional images, each of which is input to a respective one of the plurality of duplicates of the encoder unit.

2. The system of claim 1, wherein the stack of two-dimensional images is: a sequence of video frames; or a sequence of spatial cross-sectional images.

3. The system of claim 1, wherein the combined output from the plurality of duplicates of the encoder unit comprises combined latent space output corresponding to the stack of two-dimensional images.

4. The system of claim 1, wherein the plurality of duplicates of the encoder unit comprise at least one of: different input layers of the pretrained artificial neural network; different latent variables layers of the pretrained artificial neural network; or different output layers of the pretrained artificial neural network.

5. The system of claim 1, wherein the network augmentation component combines the output data from the plurality of duplicates of the encoder unit at one or more combination points defined in the pretrained artificial neural network, and wherein the one or more combination points are defined by an entity.

6. The system of claim 1, wherein the network augmentation component averages the output data from the plurality of duplicates of the encoder unit to generate the combined output data.

7. The system of claim 1, wherein the network augmentation component combines the output data from the plurality of duplicates of the encoder unit to provide temporal context or spatial context for any two-dimensional image in the stack of two-dimensional images.

8. A computer-implemented method, comprising:
    accessing, by a device operatively coupled to a processor, a pretrained artificial neural network that is configured to perform an inferencing task on a two-dimensional image;
    duplicating, by the device and without retraining, an encoder unit of the pretrained artificial neural network one or more times, thereby yielding a plurality of duplicates of the encoder unit, wherein the plurality of duplicates of the encoder unit are arranged in parallel with each other, wherein respective outputs of the plurality of duplicates of the encoder unit are combined and routed to a decoder unit of the pretrained artificial neural network; and
    employing, by the device, the pretrained artificial neural network after the duplicating to perform the inferencing task on a stack of two-dimensional images, each of which is input to a respective one of the plurality of duplicates of the encoder unit.

9. The computer-implemented method of claim 8, wherein the stack of two-dimensional images is: a sequence of video frames; or a sequence of spatial cross-sectional images.

10. The computer-implemented method of claim 8, wherein combined output data from the plurality of duplicates of the encoder unit comprises combined latent space output data corresponding to the stack of two-dimensional images.

11. The computer-implemented method of claim 8, wherein the plurality of duplicates of the encoder unit comprise at least one of: different input layers of the pretrained artificial neural network; different latent variables layers of the pretrained artificial neural network; or different output layers of the pretrained artificial neural network.

12. The computer-implemented method of claim 8, wherein outputs from the plurality of duplicates of the encoder unit are combined at one or more combination points defined in the pretrained artificial neural network, wherein the one or more combination points are defined by an entity.

13. The computer-implemented method of claim 8, wherein outputs of the plurality of duplicates of the encoder unit are combined via averaging.

14. The computer-implemented method of claim 8, wherein combining outputs of the plurality of duplicates of the encoder unit provides temporal or spatial context for any two-dimensional image in the stack of two-dimensional images.

15. A computer program product that facilitates temporalizing or spatializing a machine learning and/or artificial intelligence network, the computer program product comprising a non-transitory computer-readable memory having program instructions embodied therewith, the program instructions executable by a processor to cause the processor to:
- access a pretrained artificial neural network that is configured to perform an inferencing task on a two-dimensional image;
- duplicate, without retraining, an encoder unit of the pretrained artificial neural network one or more times, thereby yielding a plurality of duplicates of the encoder unit, wherein the plurality of duplicates of the encoder unit are arranged in parallel with each other, wherein respective outputs of the plurality of duplicates of the encoder unit are combined and routed to a decoder unit of the pretrained artificial neural network; and
- employ the pretrained artificial neural network after the duplicating to perform the inferencing task on a stack of two-dimensional images, each of which is input to a respective one of the plurality of duplicates of the encoder unit.

16. The computer program product of claim 15, wherein the stack of two-dimensional images is: a sequence of video frames; or a sequence of spatial cross-sectional images.

17. The computer program product of claim 15, wherein combined output data from the plurality of duplicates of the encoder unit comprises combined latent space output data corresponding to the stack of two-dimensional images.

18. The computer program product of claim 15, wherein the plurality of duplicates of the encoder unit comprise at least one of: different input layers of the pretrained artificial neural network; different latent variables layers of the pretrained artificial neural network; or different output layers of the pretrained artificial neural network.

19. The computer program product of claim 15, wherein output data from the plurality of duplicates of the encoder unit are combined at one or more combination points defined in the pretrained artificial neural network, wherein the one or more combination points are defined by an entity.

20. The computer program product of claim 15, wherein outputs of the plurality of duplicates of the encoder unit are combined via averaging.

* * * * *